United States Patent
Wang et al.

(10) Patent No.: US 11,685,868 B2
(45) Date of Patent: *Jun. 27, 2023

(54) CATALYTIC CRACKING GASOLINE UPGRADING METHOD

(71) Applicant: FUZHOU UNIVERSITY, Fujian (CN)

(72) Inventors: Tinghai Wang, Fujian (CN); Yuanyuan Yue, Fujian (CN); Xiaojun Bao, Fujian (CN); Xueli Wang, Fujian (CN); Jie Liu, Fujian (CN); Pei Yuan, Fujian (CN); Haibo Zhu, Fujian (CN); Zhengshuai Bai, Fujian (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 208 days.

This patent is subject to a terminal disclaimer.

(21) Appl. No.: 17/134,262

(22) Filed: Dec. 26, 2020

(65) Prior Publication Data

US 2021/0115343 A1  Apr. 22, 2021

Related U.S. Application Data

(63) Continuation of application No. PCT/CN2018/122101, filed on Dec. 19, 2018.

(30) Foreign Application Priority Data

Sep. 11, 2018 (CN) .......................... 201811058005.4

(51) Int. Cl.
| | |
|---|---|
| *C10G 65/06* | (2006.01) |
| *B01J 23/888* | (2006.01) |
| *B01J 37/02* | (2006.01) |
| *C10G 45/08* | (2006.01) |
| *C10G 45/64* | (2006.01) |

(52) U.S. Cl.
CPC .......... *C10G 65/06* (2013.01); *B01J 23/8885* (2013.01); *B01J 37/0213* (2013.01); *C10G 45/08* (2013.01); *C10G 45/64* (2013.01); *C10G 2300/202* (2013.01); *C10G 2300/305* (2013.01); *C10G 2300/70* (2013.01); *C10G 2400/02* (2013.01)

(58) Field of Classification Search
CPC .. B01J 23/888; B01J 23/8885; B01J 37/0213; B01J 29/26; B01J 29/7815; C10G 65/06; C10G 45/08; C10G 45/64; C10G 2400/02; C10G 2300/202; C10G 2300/305; C10G 2300/70
See application file for complete search history.

(56) References Cited

U.S. PATENT DOCUMENTS

2017/0333881 A1  11/2017  Choi et al.

FOREIGN PATENT DOCUMENTS

| CN | 1295110 | 5/2001 |
|---|---|---|
| CN | 101484241 | 7/2009 |
| CN | 101885985 | 11/2010 |
| CN | 103480432 | 1/2014 |
| CN | 106693982 | 5/2017 |
| CN | 107177371 | 9/2017 |
| CN | 108219841 | 6/2018 |

*Primary Examiner* — Prem C Singh
*Assistant Examiner* — Brandi M Doyle
(74) *Attorney, Agent, or Firm* — JCIP Global Inc.

(57) ABSTRACT

A catalytic cracking gasoline upgrading method is provided. First, in the presence of a prehydrogenation catalyst, the full-range FCC gasoline undergoes prehydrogenation in a prehydrogenation reactor to remove diolefins, mercaptans and sulfides, and then the prehydrogenation product undergoes selective hydrodesulfurization in the presence of a hydrodesulfurization-isomerization catalyst, and straight-chain olefins are isomerized into single-branched olefins or single-branched alkanes, thus obtaining a low-olefin, ultralow-sulfur and high-octane clean gasoline product.

30 Claims, No Drawings

CATALYTIC CRACKING GASOLINE UPGRADING METHOD

CROSS-REFERENCE TO RELATED APPLICATION

The present application is a continuation of international application of PCT application serial No. PCT/CN2018/122101 filed on Dec. 19, 2018, which claims the priority benefit of China application No. 201811058005.4 filed on Sep. 11, 2018. The entirety of each of the above-mentioned patent applications is incorporated herein by reference and made a part of this specification.

BACKGROUND OF THE INVENTION

1. Technical Field

The invention relates to a catalytic cracking gasoline upgrading method, and in particular to a method for producing low-olefin and ultralow-sulfur clean gasoline with low octane loss by carrying out prehydrogenation, hydrodesulfurization, and isomerization on catalytic cracking gasoline.

2. Description of Related Art

FCC (Fluid Catalytic Cracking) gasoline is a mixture of hydrocarbons with 4-12 carbon atoms and trace amounts of sulfides, oxides, metal arsenides, etc. According to the differences in the nature of crude oil and processing routes of various refineries, FCC gasoline is a mixture of olefins (18-55 v %), aromatics (12-20 v %) and alkanes. In terms of the octane number property, all the components are sequenced as follows: aromatics>alkenes≈isoparaffins>alkanes. High-sulfur, high-olefin and low-octane FCC gasoline accounts for about 70% in China, and the proportion of low-sulfur, low-olefin and high-octane alkylated oil, isomerized oil and reformed oil is low. This makes the clean production of FCC gasoline in China needs to reach the triple mission goals of desulfurization, olefin reduction and maintaining octane number.

Alumina carriers are widely used in fields of heterogeneous catalysts, catalyst carriers, etc. The thermal stability, hydrothermal stability, and coking resistance of the carrier alumina are not ideal. Usually additives are added for modification to improve the performance of the carriers. There are many patented technologies for modified alumina carriers. CN201310429334.6 discloses a high-performance catalyst carrier and a preparation method thereof, applied to catalyst carrier material for heterogeneous catalytic reactions. The main component of this high-performance catalyst carrier is a mixture of oxides of Al, Zr, Mg, Ti, and Si, modified with rare earth elements or chromium. The preparation method includes the preparation of carrier particles and the modification of carrier particles. The prepared high-temperature carrier has a specific surface area of 80 $m^2/g$ or above and a pore volume of 0.3 ml/g, and the specific surface area retention rate after high-temperature steam treatment is 90% or above. The catalyst carrier can be used for the preparation of high-temperature reaction catalysts, can withstand high temperatures above 600° C., and can be used at a temperature between 400° C. and 650° C. In the high temperature reaction, the active ingredient metal or metal oxide particles are hardly sintered and keep stable performance, and the catalyst has a long life. CN200780024779.9 provides an exhaust gas purification catalyst, which has a porous silica carrier composed of silica having a pore structure, and perovskite-type composite oxide particles loaded in the pore structure of the porous silica carrier. Here, in this porous silica carrier, in its pore distribution, the peak derived from the gap between the primary particles is in the range of 3 nm to 100 nm.

The most commonly used carrier for gasoline hydrodesulfurization catalysts is alumina. In order to improve the activity and stability of the catalyst, a composite carrier is prepared by using modified alumina such as silicon, titanium, magnesium, boron, and phosphorus, which can adjust the pore structure, surface acidity of the catalyst and the interaction between the active ingredients and the carrier. In addition, adjusting the pore structure of the carrier will also increase the specific surface of the carrier, and its performance is several times superior to that of similar products currently used.

At present, among the gasoline quality upgrading technologies commonly used by domestic refineries, the highly selective desulfurization process represented by Prime-G technology adopts a prehydrogenation-light and heavy gasoline cutting-heavy gasoline selective hydrodesulfurization-heavy gasoline supplementary desulfurization process principle. However, due to the different composition and content of specific gasoline raw materials, as well as different gasoline product standards, obvious differences also exist in terms of the gasoline upgrading process and the catalysts used.

BRIEF SUMMARY OF THE INVENTION

The invention provides a catalytic cracking gasoline upgrading method, i.e., a method for producing low-olefin and ultralow-sulfur clean gasoline with low octane loss by carrying out prehydrogenation, hydrodesulfurization, and isomerization on catalytic cracking gasoline.

Provided is a catalytic cracking gasoline upgrading method. First, in the presence of a prehydrogenation catalyst, the full-range FCC gasoline undergoes prehydrogenation in a prehydrogenation reactor to remove diolefins, mercaptans and sulfides, and then the prehydrogenation product undergoes selective hydrodesulfurization in the presence of a hydrodesulfurization-isomerization catalyst, and straight-chain olefins are isomerized into single-branched olefins or single-branched alkanes at the same time, thus obtaining ultralow-sulfur clean gasoline.

The prehydrogenation catalyst takes one or more of amorphous silicon aluminum, alumina, Y molecular sieve, ZSM-5, mordenite, SAPO-11, and a beta molecular sieve as a carrier, impregnated with one or more active components of cobalt, molybdenum, nickel, and tungsten and then impregnated with acidic substances; with slow acidic release and acidic gradient distribution, the prehydrogenation catalyst inhibits cracking.

The prehydrogenation reaction of the invention mainly includes the following: in the presence of the prehydrogenation catalyst, small molecule mercaptan and thioether undergo thioetherification reaction with diolefin and double bond isomerization (i.e., terminal olefins are converted into internal olefins), and the remaining diolefins are saturated.

The reaction conditions of prehydrogenation are as follows: the reaction temperature is between 80° C. and 160° C., the reaction pressure is between 1 MPa and 5 MPa, the liquid-volume hourly space velocity is from 1 $h^{-1}$ to 10 $h^{-1}$, and the hydrogen-oil volume ratio is (3-8):1.

The process conditions of the hydrodesulfurization-isomerization reaction are as follows: the reaction temperature is between 190° C. and 330° C., the reaction pressure is between 1.2 MPa and 3.5 MPa, the liquid-volume hourly space velocity is from 2.5 h$^{-1}$ to 5 h$^{-1}$, and the hydrogen-oil volume ratio is (160-460):1.

The selective hydrodesulfurization-isomerization catalyst for the catalytic cracking gasoline includes a carrier and an active ingredient, the carrier includes an alumina composite carrier with a macroporous structure, and the alumina composite carrier contains 0.1-12 wt % of tungsten-doped lanthanum ferrite, the mesopores of the alumina composite carrier account for 1-85% of the total pores, and the macropores of the alumina composite carrier account for 1-70% of the total pores. Preferably, the mesopores account for 5-70% of the total pores, and preferably the macropores account for 5-45% of the total pores. The surface of the carrier loads phosphomolybdic acid, phosphotungstic acid or phosphomolybdotungstic acid, and the content of the phosphomolybdic acid, phosphotungstic acid or phosphomolybdotungstic acid in the catalyst is between 0.1% and 16.5% as oxides.

As a further improvement, the surface of the above catalyst is impregnated with active ingredients to obtain an improved catalyst. By weight, the catalyst includes 0.1-14.5% of a metal active ingredient, and the metal active ingredient is one or more of cobalt, molybdenum, nickel, and tungsten.

The aforementioned active ingredients cobalt, molybdenum, nickel, and tungsten may be one or more of various salts or respective oxides, sulfides, nitrides, and phosphides of the active ingredients.

As a further improvement, the catalyst further includes one or more of ZSM-5, ZSM-11, ZSM-12, ZSM-35, mordenite, SAPO-11, MCM-22, a Y molecular sieve or a beta molecular sieve.

The preparation method of the catalyst includes the following steps: preparing an impregnation solution with phosphomolybdic acid, phosphotungstic acid or phosphomolybdotungstic acid, impregnating the carrier in the impregnation solution, drying at 120-180° C. for 4-8 h, and calcining at 450-800° C. for 3-9 h, thus obtaining a hydrodesulfurization-isomerization catalyst.

The alumina composite carrier contains 0.1-12 wt % of tungsten-doped lanthanum ferrite, mesopores of the carrier account for 1-85% of the total pores, and macropores of the carrier account account for 1-70% of the total pores. Preferably, the mesopores account for 5-70% of the total pores, and preferably the macropores account for 5-45% of the total pores.

Provided is a preparation method of an alumina composite carrier. The aluminum source and sesbania powder are added to a kneader and mixed well; an inorganic acid solution and an organic polymer are added and the mixture is well kneaded; and then tungsten-doped lanthanum ferrite is added, and the mixture is well kneaded; the resulting material is subjected to extruding, molding, drying and calcination, thus obtaining the alumina composite carrier.

The above alumina composite carrier powder and one or more of ZSM-5, ZSM-11, ZSM-12, ZSM-35, mordenite, SAPO-11, MCM-22, Y molecular sieve and beta molecular sieve powder are well mixed, sesbania powder and deionized water are then added and mixed well; an inorganic acid is added; the resulting material is molded, dried, and calcined, thus obtaining a composite carrier; and the composite carrier loads phosphomolybdic acid, phosphotungstic acid or phosphomolybdotungstic acid. The content of the phosphomolybdic acid, phosphotungstic acid or phosphomolybdotungstic acid in the carrier is between 0.1% and 16.5% as oxides.

The aluminum source for preparing the alumina composite carrier is one or more of pseudo-boehmite, alumina, and aluminum sulfate. The aluminum source can also be one or more of kaolin, rectorite, perlite, and montmorillonite.

As a further improvement of the carrier, provided is an improved alumina composite carrier. The carrier contains 0.1-12 wt % of silicon oxide and 0.1-10 wt % of tungsten-doped lanthanum ferrite, and mesopores of the carrier account for 1-80% of the total pores, and macropores account for 1-55% of the total pores. Preferably, the mesopores account for 1-65% of the total pores, more preferably 5-55%; preferably, the macropores account for 1-40% or 5-45% of the total pores, more preferably 10-35%. The micropores, mesopores, and macropores of the carrier are unevenly distributed.

Preferably, the tungsten-doped lanthanum ferrite in the alumina composite carrier accounts for 0.3-9 wt %, more preferably 0.3-5 wt %, and in the tungsten-doped lanthanum ferrite, tungsten accounts for 0.1-8 wt %.

The organic polymer is one or more of polyvinyl alcohol, sodium polyacrylate, polyethylene glycol, and polyacrylate, and preferably is polyacrylic acid or sodium polyacrylate.

Compared with the alumina carrier added with lanthanum ferrite (LaFeO$_3$), the alumina composite carrier is added with tungsten-doped lanthanum ferrite and impregnated with phosphomolybdic acid, phosphotungstic acid or phosphomolybdotungstic acid on the surface, and thus the catalyst has high hydrodesulfurization activity, and the linear olefins are isomerized to form single-branched olefins or single-branched alkanes with good selectivity.

In a further improvement of the carrier, silicon oxide is preferably added to the alumina composite carrier. According to the preparation method of the alumina composite carrier, pseudo-boehmite and sesbania powder are added to a kneader and mixed well; an inorganic acid solution and an organic polymer are added and the mixture is well kneaded; and then tungsten-doped lanthanum ferrite is added, and the mixture is well mixed, thus obtaining an alumina precursor for later use; a silicon source is added to the acid solution of the organic polymer and mixed well, and the mixture is then mixed with the alumina precursor, wherein the unit content of the organic polymer in the alumina precursor is 1.5 times higher than the content of the organic polymer in the silicon source; and the resulting material is subjected to extruding, molding, drying and calcination, thus obtaining the alumina composite carrier. The silicon source may be sodium silicate or fine silicon powder.

In the further improvement of the above alumina composite carrier, the silicon source may be sodium silicate or fine silicon powder, or one or two of diatomaceous earth and opal, and the aluminum source may also be one or more of kaolin, rectorite, perlite, and montmorillonite.

The sub-molten salt medium in the activation process of kaolin, rectorite, perlite, and montmorillonite powder is NaOH—H$_2$O; the bauxite powder and sub-molten salt medium are well mixed in a mass ratio of 1:0.2-2, and the activation lasts for 0.5-4 h at a temperature between 100° C. and 400° C. The activation process of diatomaceous earth and opal is to calcine the diatomaceous earth at a temperature between 500° C. and 1000° C. for 1-10 h. The tungsten-doped lanthanum ferrite in the above alumina composite carrier preferably has micro-mesopores. Due to the introduction of tungsten-doped lanthanum ferrite with micro-mesopores, the prepared catalyst can help suppress side reactions and improve the selectivity of the target product. Provided is a preparation method of tungsten-doped lanthanum ferrite with micro-mesopores. Citric acid is dissolved in deionized water and stirred, and then lanthanum nitrate and ferric nitrate are added to citric acid, stirred and dissolved, and sodium polyacrylate or polyacrylic acid is added in an amount 0.1-9 wt %, preferably 0.1-6.0 wt % of the tungsten-doped lanthanum ferrite. Then, a tungsten-containing compound is added (tungsten accounts for 0.1-8 wt % of tungsten-doped lanthanum ferrite as oxides) and stirred to take a reaction; and the reaction product is dried, calcined, and ground, thus obtaining a finished product. The tungsten-containing compound refers to ammonium tungstate, ammonium metatungstate, ammonium paratungstate and the like.

The unit content of the organic polymer in the alumina precursor is more than 1.5 times higher than the content of the organic polymer in the silicon source. It can effectively improve the pore structure of the carrier. On the one hand, the carrier's micropores, mesopores, and macropores are unevenly distributed, reducing the occurrence of side reactions such as olefin polymerization and excessive cracking, improving selectivity, ensuring a high gasoline yield, and facilitating the long-term operation of the device. On the other hand, it is beneficial to producing more active site load centers on the surface of the carrier and improving the catalyst activity.

The hydrodesulfurization-isomerization catalyst of the invention takes macroporous alumina containing tungsten-doped lanthanum ferrite as a carrier to load tungsten phosphomolybdate, phosphotungstic acid or phosphomolybdotungstic acid and/or one or more of cobalt, molybdenum, nickel, and tungsten and is used for the selective desulfurization-isomerization of gasoline hydrogenation. It not only effectively promotes single-branched isomerization and increases the octane number, but also helps reduce the recracking reaction of low-carbon isomerized hydrocarbons, reduces the occurrence of side reactions such as olefin polymerization and excessive cracking, improves activity selectivity, and ensures a high gasoline yield. The catalyst is applied to the catalytic cracking gasoline to produce clean gasoline that meets national standards GB18352.5-2013 and GB 17930-2016.

DETAILED DESCRIPTION OF THE INVENTION

The invention is described in further detail below through examples, but these examples should not be considered as limiting the invention. The raw material reagents used in the invention are all commercially available products.

Example 1

1. Preparation of Tungsten-Doped Lanthanum Ferrite with Micro-Mesopores 2.2 mol of La $(NO_3)_3$ was dissolved in 100 mL of water in a stirring way, and citric acid was added and stirred to be dissolved; 4.2 mol of $Fe(NO_3)_3$, 160 g of sodium polyacrylate, and an aqueous solution containing 10 g of ammonium metatungstate were added in sequence and the resulting solution was further stirred for 30 min; the resulting solution was subjected to drying, calcination and grinding, thus obtaining micro-mesoporous tungsten-doped lanthanum ferrite.

2. Preparation of Alumina Carrier 2.2 g of micro-mesoporous tungsten-doped lanthanum ferrite was added with citric acid for later use, 300 g of pseudo-boehmite powder and 20.0 g of sesame powder were added to a kneader and mixed well, and then nitric acid and 8 g of sodium polyacrylate were added and the resulting material was kneaded well; the micro-mesoporous tungsten-doped lanthanum ferrite was then added and mixed well; the resulting material was kneaded and extruded into a clover shape. The resulting material was dried at 120° C. for 8 h and calcined at 700° C. for 4 h, thus obtaining an alumina carrier 1 containing the micro-mesoporous tungsten-doped lanthanum ferrite. The pore structure of the carrier is shown in Table 1.

3. Preparation of Catalyst

The above alumina carrier was impregnated with the phosphomolybdotungstic acid impregnation solution, and the obtained catalyst precursor was dried at 140° C. and then calcined at 600° C. for 7 h, thus obtaining catalyst 1. The catalyst 1 mainly comprised: 90.2 wt % of the alumina carrier containing micro-mesoporous tungsten-doped lanthanum ferrite and 9.8 wt % of a phosphomolybdenum tungsten oxide.

Example 2

1. Preparation of Tungsten-Doped Lanthanum Ferrite 2.2 mol of La $(NO_3)_3$ was dissolved in 100 mL of water in a stirring way, and citric acid was added and stirred to be dissolved; 4.2 mol of $Fe(NO_3)_3$ and an aqueous solution containing 10 g of ammonium metatungstate were added in sequence and the resulting solution was further stirred for 30 min; the resulting solution was subjected to drying, calcination and grinding, thus obtaining tungsten-doped lanthanum ferrite.

2. Preparation of Alumina Carrier 2.2 g of tungsten-doped lanthanum ferrite was added with citric acid, 300 g of pseudo-boehmite powder and 20.0 g of sesame powder were added to a kneader and mixed well, and then nitric acid and 8 g of sodium polyacrylate were added and the resulting material was kneaded well; the tungsten-doped lanthanum ferrite was then added and mixed well; the resulting material was kneaded and extruded into a clover shape. The resulting material was dried at 120° C. for 8 h and calcined at 700° C. for 4 h, thus obtaining an alumina carrier 2 containing the tungsten-doped lanthanum ferrite. The pore structure of the carrier is shown in Table 1.

3. Preparation of Catalyst

The above alumina carrier was impregnated with the phosphomolybdic acid impregnation solution, and the obtained catalyst precursor was dried at 140° C. and then calcined at 630° C. for 5 h, thus obtaining catalyst 2. The catalyst 2 mainly comprised: 85.2 wt % of the alumina carrier containing tungsten-doped lanthanum ferrite and 14.8 wt % of a phosphomolybdenum oxide.

Example 3

The preparation of the carrier was same as that in Example 1, except that the micro-mesoporous tungsten-doped lanthanum ferrite accounted for 6 wt % of the carrier. The preparation of the catalyst was the same as that in Example 1, and activated montmorillonite was used as the aluminum source. The difference lied in the addition of phosphomolybdic acid, and the catalyst 3 mainly comprised: 88.8 wt % of the alumina carrier containing micro-mesoporous tungsten-doped lanthanum ferrite and 11.2 wt % of a molybdophosphoric oxide.

Example 4

Preparation of Modified Alumina Carrier 2 g of sodium polyacrylate was dissolved in nitric acid, and 28 g of fine silicon powder was added and stirred well to obtain a fine silicon powder-sodium polyacrylate mixture; 1/10 of the resulting mixture was taken for later use, and citric acid was added to 2.0 g of the micro-mesoporous tungsten-doped lanthanum ferrite and the resulting material was set aside for later use. 310G of pseudo-boehmite powder and 22.0 g of sesame powder were added into the kneader, nitric acid and 28 g of a nitric acid solution of sodium polyacrylate were then added in sequence and mixed well, the above-mentioned fine silicon powder-sodium polyacrylate mixture was added and knead well; and then the micro-mesoporous tungsten-doped lanthanum ferrite was added and mixed well; and the resulting material was kneaded and extruded into a clover shape. The resulting material was dried at 130° C. for 7 h and calcined at 650° C. for 5 h, thus obtaining an alumina carrier 4 containing the micro-mesoporous tungsten-doped lanthanum ferrite and silicon oxide.

The preparation of the catalyst was the same as that in Example 1, except that the carrier was impregnated with phosphotungstic acid and ammonium molybdate (the weight of molybdenum oxide accounted for 4.1% of the catalyst), and the catalyst 4 mainly comprised: 88.9 wt % of the alumina carrier containing micro-mesoporous tungsten-doped lanthanum ferrite and 7.0 wt % of a phosphotungsten oxide.

Example 5

2.0 mol of La $(NO_3)_3$ was dissolved in 100 mL of water in a stirring way, and citric acid was added and stirred to be dissolved; 4.0 mol of $Fe(NO_3)_3$ and an aqueous solution containing 12 g of ammonium metatungstate were added in sequence and the resulting solution was further stirred for 30 min; the resulting solution was subjected to drying, calcination and grinding, thus obtaining micro-mesoporous tungsten-doped lanthanum ferrite.

The preparation of the carrier was the same as that in Example 4, except that the tungsten-doped lanthanum ferrite accounted for 3 wt % of the carrier, the carrier was impregnated with phosphomolybdotungstic acid and cobalt nitrate (the weight of cobalt oxide accounted for 3.6% of the catalyst), and the activated diatomite and kaolin were used as a silicon source and an aluminum source. The catalyst 5 mainly comprised: 86.8 wt % of the alumina carrier containing tungsten-doped lanthanum ferrite and silicon oxide and 9.6 wt % of a phosphomolybdenum tungsten oxide.

Example 6

The preparation of the catalyst was the same as that in Example 4, except that mordenite was added to the catalyst, and the catalyst 6 mainly comprised: 83.3 wt % of the alumina carrier 4 containing micro-mesoporous tungsten-doped lanthanum ferrite and silicon oxide, 7.2 wt % of mordenite, and 9.5 wt % of a phosphotungsten oxide. Activated diatomite and kaolin were used as a silicon source and an aluminum source.

Example 7

The preparation of the catalyst was the same as that in Example 6, except that ZSM-5 molecular sieve was added to the catalyst, and the catalyst 7 mainly comprised: 82.1 wt % of the alumina carrier 4 containing micro-mesoporous tungsten-doped lanthanum ferrite and silicon oxide, 5.4 wt % of ZSM-5, and 12.5 wt % of a phosphotungsten oxide. Activated diatomite and kaolin were used as a silicon source and an aluminum source.

TABLE 1

The specific surface area and pore size distribution of the macroporous alumina carrier

| | Specific surface area $m^2/g$ | Total pore volume ml/g | Macropore volume ml/g | Macropore size nm | Mesopore size nm |
|---|---|---|---|---|---|
| 1 | 264.2 | 1.57 | 0.75 | 121 | 31 |
| 2 | 257.7 | 1.66 | 0.87 | 96 | 40 |
| 3 | 268.2 | 1.51 | 0.56 | 103 | 21 |
| 4 | 262.4 | 1.81 | 0.60 | 147 | 34 |
| 5 | 265.3 | 1.75 | 0.45 | 132 | 26 |

TABLE 2

Results of hydrodesulfurization-isomerization reaction of catalyst

| Catalyst | Desulfurization rate % | Single-branched olefin increment % | Single-branched alkane increment % | Octane loss | Liquid yield wt % |
|---|---|---|---|---|---|
| Example 1 | 87.9 | 13.2 | 15.0 | 0.3 | 98.1 |
| Example 2 | 85.6 | 10.8 | 12.9 | 0.4 | 98.2 |
| Example 3 | 91.8 | 14.1 | 14.6 | 0.2 | 98.5 |
| Example 4 | 90.8 | 18.3 | 17.3 | 0.3 | 98.9 |
| Example 5 | 92.2 | 15.2 | 13.8 | 0.5 | 98.4 |
| Example 6 | 91.2 | 19.4 | 15.9 | 0.2 | 98.3 |
| Example 7 | 91.7 | 20.5 | 18.3 | 0.2 | 98.6 |
| Example 8 | 91.8 | 14.8 | 15.2 | 0.2 | 98.7 |
| Example 9 | 91.5 | 17.8 | 16.4 | 0.2 | 98.7 |
| Comparative Example 1 | 83.5 | 0.5 | 1.2 | 1.4 | 94.3 |

FCC gasoline was first hydrogenated through a prehydrogenation reactor to remove diolefins, mercaptans, and sulfides, and was also subjected to double bond isomerization (i.e., conversion of terminal olefins into internal olefins), and the remaining diolefins were saturated. The reaction temperature was 105° C., the reaction pressure was 1.2 MPa, the liquid-volume hourly space velocity was 5 $h^{-1}$, and the hydrogen-oil volume ratio was 5:1. The catalyst comprised 8% of $MoO_3$, 5% of NiO, 2.6% of $P_2O_5$, and 84.4% of $\gamma$-$Al_2O_3$. The prehydrogenation product with 100% diolefins removed underwent deep desulfurization and isomerization in a selective hydrodesulfurization unit in the presence of hydrodesulfurization-isomerization catalysts 1-7. The reaction process was carried out at a reactor temperature of 265° C., a reaction pressure of 1.6 MPa, a liquid-volume hourly space velocity of 3.5 $h^{-1}$, and a hydrogen-oil volume ratio of 325. After about 60 hours of reaction, samples were taken and analyzed. The results are shown in Table 2.

Hydrodesulfurization-isomerization catalyst 1-7 has the advantages of low octane loss, high liquid yield, high desulfurization rate and good activity. The catalyst can effectively inhibit side reactions such as olefin polymerization and excessive cracking, and reduce the recracking reaction of low-carbon isohydrocarbons; the surface of the catalyst carrier produces more active site load centers, which effectively improves the activity of the catalysts in removing diolefins, mercaptans, sulfides, and double bond isomerization. The catalysts have good activity and selectivity. After 600 hours of the reaction, for the products of the hydrodesulfurization-isomerization catalysts 4 and 6, the desulfurization rates were 91.4% and 90.5%, respectively; the octane losses were 0.2 unit and 0.3 unit, respectively; the carbon deposition rates were 2.9 and 2.2, respectively; and the liquid yields were 98.7% and 98.6%, respectively. The increments of single-branched alkene were 18.1% and 19.2%, respectively; and the increments of single-branched alkane were 17.6% and 16.1%, respectively. The reaction performance of the catalysts was stable.

Example 8

FCC gasoline was first hydrogenated through a prehydrogenation reactor to remove diolefins, mercaptans, and sulfides, and was also subjected to double bond isomerization (i.e., conversion of terminal olefins into internal olefins), and the remaining diolefins were saturated. The reaction temperature was 100° C., the reaction pressure was 1.8 MPa, the liquid-volume hourly space velocity was 4 $h^{-1}$, and the hydrogen-oil volume ratio was 4.5:1. The catalyst comprised 11% of $MoO_3$, 33.5% of WO, 71.3% of amorphous silicon-aluminum, and 14.2% of mordenite. The prehydrogenation product underwent deep desulfurization and isomerization in a selective hydrodesulfurization unit in the presence of hydrodesulfurization-isomerization catalyst 5. The reaction process was carried out at a reactor temperature of 245° C., a reaction pressure of 1.6 MPa, a liquid-volume hourly space velocity of 4.0 $h^{-1}$, and a hydrogen-oil volume ratio of 350. After about 60 hours of reaction, samples were taken and analyzed. The results are shown in Table 2.

Example 9

FCC gasoline was first hydrogenated through a prehydrogenation reactor to remove diolefins, mercaptans, and sulfides, and was also subjected to double bond isomerization (i.e., conversion of terminal olefins into internal olefins), and the remaining diolefins were saturated. The reaction temperature was 100° C., the reaction pressure was 1.8 MPa, the liquid-volume hourly space velocity was 4 $h^{-1}$, and the hydrogen-oil volume ratio was 4.5:1. The catalyst comprised 9% of $MoO_3$, 35% of WO, and 86% of beta molecular sieve. The prehydrogenation product underwent deep desulfurization and isomerization in a selective hydrodesulfurization unit in the presence of hydrodesulfurization-isomerization catalyst 6. The reaction process was carried out at a reactor temperature of 260° C., a reaction pressure of 1.9 MPa, a liquid-volume hourly space velocity of 4.5 $h^{-1}$, and a hydrogen-oil volume ratio of 400. After about 60 hours of reaction, samples were taken and analyzed. The results are shown in Table 2.

COMPARATIVE EXAMPLE 1

The preparation of the carrier was the same as that in Example 4, except that lanthanum ferrite was added. The preparation of the catalyst was the same as that in Example 4, and the reaction conditions were the same as those in Example 4. The reaction results are shown in Table 2.

Certainly, the invention can also have various other embodiments. Without departing from the spirit and essence of the invention, those skilled in the art can make various corresponding changes and modifications according to the invention, but these corresponding changes and deformation should belong to the protection scope of the invention.

What is claimed is:

1. A catalytic cracking gasoline upgrading method, comprising: first, in the presence of a prehydrogenation catalyst, removing diolefins, mercaptans and sulfides from full-range FCC gasoline through a prehydrogenation reactor and converting double bond isomeric terminal olefins into internal olefins at the same time; and then carrying out selective hydrodesulfurization on the prehydrogenation product in the presence of a hydrodesulfurization-isomerization catalyst, and isomerizing straight-chain olefins into single-branched olefins or single-branched alkanes, thus obtaining ultralow-sulfur clean gasoline; wherein the hydrodesulfurization-isomerization catalyst comprises a carrier and an active ingredient, the carrier contains an alumina composite carrier with a macroporous structure, the alumina composite carrier contains 0.1-12 wt % of tungsten-doped lanthanum ferrite, tungsten in the tungsten-doped lanthanum ferrite accounts for 0.1-8 wt %, the mesopores of the alumina composite carrier account for 1-85% of the total pores, and the macropores of the alumina composite carrier account for 1-70% of the total pores; the surface of the carrier is loaded with phosphomolybdic acid, phosphotungstic acid or phosphomolybdotungstic acid; by weight, the content of phosphomolybdic acid, phosphotungstic acid or phosphomolybdotungstic acid in the catalyst is between 0.1% and 16.5% as oxides.

2. The catalytic cracking gasoline upgrading method according to claim 1, wherein the carrier of the prehydrogenation catalyst comprises one or more of amorphous silicon aluminum, alumina, Y molecular sieve, ZSM-5, mordenite, SAPO-11, and a beta molecular sieve, impregnated with one or more active components of cobalt, molybdenum, nickel, and tungsten.

3. The catalytic cracking gasoline upgrading method according to claim 2, wherein by weight, the hydrodesulfurization-isomerization catalyst comprises 0.1-14.5% of a metal active component, and the metal active component is one or more of cobalt, molybdenum, nickel, and tungsten.

4. The catalytic cracking gasoline upgrading method according to claim 2, wherein the alumina composite carrier in the hydrodesulfurization-isomerization catalyst contains 0.1-12 wt % of silicon oxide and 0.1-10 wt % of tungsten-doped lanthanum ferrite; mesopores account for 1-80% of the total pores, macropores account for 1-40% of the total pores, and the micropores, mesopores, and macropores in the carrier are unevenly distributed.

5. The catalytic cracking gasoline upgrading method according to claim 2, wherein the tungsten-doped lanthanum ferrite in the carrier accounts for 0.3-9 wt %.

6. The catalytic cracking gasoline upgrading method according to claim 2, wherein the tungsten-doped lanthanum ferrite is tungsten-doped lanthanum ferrite with micro-mesopores.

7. The catalytic cracking gasoline upgrading method according to claim 2, wherein the preparation method of the alumina composite carrier comprises: adding an aluminum source and sesbania powder to a kneader and mixing; adding an inorganic acid solution and an organic polymer and kneading; and then adding tungsten-doped lanthanum ferrite and kneading; and carrying out extruding, molding, drying and calcination, thus obtaining the alumina composite carrier.

8. The catalytic cracking gasoline upgrading method according to claim 2, wherein the hydrodesulfurization-isomerization catalyst further comprises one or more of ZSM-5, ZSM-11, ZSM-12, ZSM-35, mordenite, MCM-22, a Y molecular sieve or a beta molecular sieve.

9. The catalytic cracking gasoline upgrading method according to claim 1, wherein the reaction conditions of the prehydrogenation are as follows: the reaction temperature is between 80° C. and 160° C., the reaction pressure is between 1 MPa and 5 MPa, the liquid-volume hourly space velocity is from 1 h$^{-1}$ to 10 h$^{-1}$, and the hydrogen-oil volume ratio is (3-8):1.

10. The catalytic cracking gasoline upgrading method according to claim 9, wherein by weight, the hydrodesulfurization-isomerization catalyst comprises 0.1-14.5% of a metal active component, and the metal active component is one or more of cobalt, molybdenum, nickel, and tungsten.

11. The catalytic cracking gasoline upgrading method according to claim 9, wherein the alumina composite carrier in the hydrodesulfurization-isomerization catalyst contains 0.1-12 wt % of silicon oxide and 0.1-10 wt % of tungsten-doped lanthanum ferrite; mesopores account for 1-80% of the total pores, macropores account for 1-40% of the total pores, and the micropores, mesopores, and macropores in the carrier are unevenly distributed.

12. The catalytic cracking gasoline upgrading method according to claim 9, wherein the tungsten-doped lanthanum ferrite in the carrier accounts for 0.3-9 wt %.

13. The catalytic cracking gasoline upgrading method according to claim 9, wherein the tungsten-doped lanthanum ferrite is tungsten-doped lanthanum ferrite with micro-mesopores.

14. The catalytic cracking gasoline upgrading method according to claim 9, wherein the preparation method of the alumina composite carrier comprises: adding an aluminum source and sesbania powder to a kneader and mixing; adding an inorganic acid solution and an organic polymer and kneading; and then adding tungsten-doped lanthanum ferrite and kneading; and carrying out extruding, molding, drying and calcination, thus obtaining the alumina composite carrier.

15. The catalytic cracking gasoline upgrading method according to claim 9, wherein the hydrodesulfurization-isomerization catalyst further comprises one or more of ZSM-5, ZSM-11, ZSM-12, ZSM-35, mordenite, MCM-22, a Y molecular sieve or a beta molecular sieve.

16. The catalytic cracking gasoline upgrading method according to claim 1, wherein the reaction conditions of the hydrodesulfurization-isomerization are as follows: the reaction temperature is between 190° C. and 330° C., the reaction pressure is between 1.2 MPa and 3.5 MPa, the liquid-volume hourly space velocity is from 2.5 h$^{-1}$ to 5 h$^{-1}$, and the hydrogen-oil volume ratio is (160-460):1.

17. The catalytic cracking gasoline upgrading method according to claim 16, wherein by weight, the hydrodesulfurization-isomerization catalyst comprises 0.1-14.5% of a metal active component, and the metal active component is one or more of cobalt, molybdenum, nickel, and tungsten.

18. The catalytic cracking gasoline upgrading method according to claim 16, wherein the alumina composite carrier in the hydrodesulfurization-isomerization catalyst contains 0.1-12 wt % of silicon oxide and 0.1-10 wt % of tungsten-doped lanthanum ferrite; mesopores account for 1-80% of the total pores, macropores account for 1-40% of the total pores, and the micropores, mesopores, and macropores in the carrier are unevenly distributed.

19. The catalytic cracking gasoline upgrading method according to claim 16, wherein the tungsten-doped lanthanum ferrite in the carrier accounts for 0.3-9 wt %.

20. The catalytic cracking gasoline upgrading method according to claim 16, wherein the tungsten-doped lanthanum ferrite is tungsten-doped lanthanum ferrite with micro-mesopores.

21. The catalytic cracking gasoline upgrading method according to claim 16, wherein the preparation method of the alumina composite carrier comprises: adding an aluminum source and sesbania powder to a kneader and mixing; adding an inorganic acid solution and an organic polymer and kneading; and then adding tungsten-doped lanthanum ferrite and kneading; and carrying out extruding, molding, drying and calcination, thus obtaining the alumina composite carrier.

22. The catalytic cracking gasoline upgrading method according to claim 16, wherein the hydrodesulfurization-isomerization catalyst further comprises one or more of ZSM-5, ZSM-11, ZSM-12, ZSM-35, mordenite, MCM-22, a Y molecular sieve or a beta molecular sieve.

23. The catalytic cracking gasoline upgrading method according to claim 1, wherein by weight, the hydrodesulfurization-isomerization catalyst comprises 0.1-14.5% of a metal active component, and the metal active component is one or more of cobalt, molybdenum, nickel, and tungsten.

24. The catalytic cracking gasoline upgrading method according to claim 1, wherein the alumina composite carrier in the hydrodesulfurization-isomerization catalyst contains 0.1-12 wt % of silicon oxide and 0.1-10 wt % of tungsten-doped lanthanum ferrite; mesopores account for 1-80% of the total pores, macropores account for 1-40% of the total pores, and the micropores, mesopores, and macropores in the carrier are unevenly distributed.

25. The catalytic cracking gasoline upgrading method according to claim 24, wherein the preparation method of the alumina composite carrier comprises: adding an aluminum source and sesbania powder to a kneader and mixing; adding an inorganic acid and an organic polymer and kneading; and then adding tungsten-doped lanthanum ferrite and mixing, thus obtaining an alumina precursor for later use; adding a silicon source to an acid solution of the organic polymer and mixing, and then mixing the resulting solution with the alumina precursor, wherein the unit content of the organic polymer in the alumina precursor is 1.5 times higher than the content of the organic polymer in the silicon source; and carrying out extruding, molding, drying and calcination, thus obtaining the alumina carrier.

26. The catalytic cracking gasoline upgrading method according to claim 25, wherein the silicon source is one or two of diatomite and opal, and the aluminum source is one or more of kaolin, rectorite, perlite, and montmorillonite.

27. The catalytic cracking gasoline upgrading method according to claim 1, wherein the tungsten-doped lanthanum ferrite in the carrier accounts for 0.3-9 wt %.

28. The catalytic cracking gasoline upgrading method according to claim 1, wherein the tungsten-doped lanthanum ferrite is tungsten-doped lanthanum ferrite with micro-mesopores.

29. The catalytic cracking gasoline upgrading method according to claim 1, wherein the preparation method of the alumina composite carrier comprises: adding an aluminum source and sesbania powder to a kneader and mixing; adding an inorganic acid solution and an organic polymer and kneading; and then adding tungsten-doped lanthanum ferrite and kneading; and carrying out extruding, molding, drying and calcination, thus obtaining the alumina composite carrier.

30. The catalytic cracking gasoline upgrading method according to claim 1, wherein the hydrodesulfurization-isomerization catalyst further comprises one or more of ZSM-5, ZSM-11, ZSM-12, ZSM-35, mordenite, MCM-22, a Y molecular sieve or a beta molecular sieve.

\* \* \* \* \*

UNITED STATES PATENT AND TRADEMARK OFFICE
CERTIFICATE OF CORRECTION

PATENT NO. : 11,685,868 B2
APPLICATION NO. : 17/134262
DATED : June 27, 2023
INVENTOR(S) : Tinghai Wang et al.

It is certified that error appears in the above-identified patent and that said Letters Patent is hereby corrected as shown below:

On the Title Page

Column 1 Item (73) Assignee should read: FUZHOU UNIVERSITY, Fujian (CN)

Signed and Sealed this
Seventh Day of November, 2023

Katherine Kelly Vidal
*Director of the United States Patent and Trademark Office*